(12) United States Patent
Beifus et al.

(10) Patent No.: US 6,369,536 B2
(45) Date of Patent: Apr. 9, 2002

(54) METHODS AND APPARATUS FOR SELECTING AN ELECTRONICALLY COMMUTATED MOTOR SPEED

(75) Inventors: Brian L. Beifus, Fort Wayne, IN (US); Louis Sulfstede, Irving, TX (US); Kamron M. Wright; Glen C. Young, both of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/747,868

(22) Filed: Dec. 22, 2000

Related U.S. Application Data
(60) Provisional application No. 60/173,153, filed on Dec. 27, 1999.

(51) Int. Cl.[7] .............................................. H02K 23/00
(52) U.S. Cl. ........................ 318/254; 318/439; 318/567; 318/569; 318/138
(58) Field of Search ................................. 318/254, 138, 318/439, 567, 569; 360/77.08; 364/431.12

(56) References Cited

U.S. PATENT DOCUMENTS

| | | |
|---|---|---|
| 4,491,772 A | 1/1985 | Bitting |
| 4,494,055 A | 1/1985 | Bitting et al. |
| 4,499,408 A | 2/1985 | Bitting et al. |
| 4,500,821 A | 2/1985 | Bitting et al. |
| 4,654,566 A | 3/1987 | Erdman |
| 4,734,628 A | 3/1988 | Bench et al. |
| 4,748,822 A | 6/1988 | Erbs et al. |
| 4,959,596 A | 9/1990 | MacMinn et al. |
| 5,091,858 A * | 2/1992 | Paielli .................. 364/431.12 |
| 5,144,812 A | 9/1992 | Mills, Jr. et al. |
| 5,161,393 A | 11/1992 | Payne et al. |
| 5,301,523 A | 4/1994 | Payne et al. |
| 5,325,677 A | 7/1994 | Payne et al. |
| 5,327,856 A | 7/1994 | Schroeder et al. |
| 5,373,436 A | 12/1994 | Yamaguchi et al. |
| 5,410,230 A | 4/1995 | Bessler et al. |
| 5,423,192 A | 6/1995 | Young et al. |
| 5,438,844 A | 8/1995 | Hoglund et al. |
| 5,477,827 A | 12/1995 | Weisman, II et al. |
| 5,491,978 A | 2/1996 | Young et al. |
| 5,494,007 A | 2/1996 | Schroeder et al. |
| 5,508,820 A | 4/1996 | Kabeya |
| 5,534,763 A | 7/1996 | Williams et al. |
| 5,592,058 A | 1/1997 | Archer et al. |
| 5,598,814 A | 2/1997 | Schroeder et al. |
| 5,628,199 A | 5/1997 | Hoglund et al. |
| 5,820,352 A | 10/1998 | Gunn et al. |
| 5,821,708 A | 10/1998 | Williams et al. |
| 5,847,523 A | 12/1998 | Rappenecker et al. |
| 5,954,608 A | 9/1999 | Kirkwood et al. |
| 5,967,757 A | 10/1999 | Gunn et al. |
| 5,995,879 A | 11/1999 | Ginzel et al. |
| 6,076,622 A | 6/2000 | Chakraborty et al. |
| 6,078,859 A | 6/2000 | Jastrzebski et al. |

(List continued on next page.)

*Primary Examiner*—Karen Masih
(74) *Attorney, Agent, or Firm*—Karl Vick, Esq.; Damian Wasserbauer, Esq.; Armstrong Teasdale LLP

(57) ABSTRACT

An electronically commutated motor assembly permits a user to select discrete operating speed options to operate an electronically commutated motor. The assembly includes a motor, an input/output unit electrically connected to the motor, a connector and board and a microprocessor. The connector and board includes an electrically erasable programmable read-only memory (EEPROM), a plurality of low voltage signal connections for programming the EEPROM, and a plurality of speed signal connections for selecting an operating speed for the electronically commutated motor. The low voltage signal connections permit the EEPROM to be programmed with speed tables containing schedules of operating speeds.

25 Claims, 5 Drawing Sheets

U.S. PATENT DOCUMENTS

| | | |
|---|---|---|
| 6,082,971 A | 7/2000 | Gunn et al. |
| 6,112,719 A | 9/2000 | Earleson |
| 6,134,499 A | 10/2000 | Goode et al. |
| 6,163,117 A | 12/2000 | Rappenecker |
| 6,167,343 A | 12/2000 | Bauerle |
| 6,167,979 B1 | 1/2001 | Taylor et al. |
| 6,175,465 B1 * | 1/2001 | Kawachi et al. ......... 360/77.08 |
| 6,178,371 B1 | 1/2001 | Light et al. |
| 6,202,021 B1 | 3/2001 | Kresse et al. |
| 6,202,629 B1 | 3/2001 | Zhu et al. |
| 6,220,223 B1 | 4/2001 | Weisman, II et al. |
| 6,240,356 B1 | 5/2001 | Lapke |
| 6,246,946 B1 | 6/2001 | Ohtsu |
| 6,286,987 B1 | 9/2001 | Goode et al. |

* cited by examiner

METHODS AND APPARATUS FOR SELECTING AN ELECTRONICALLY COMMUTATED MOTOR SPEED

CROSS REFERENCE TO RELATED APPLICATION

This application claims the benefit of U.S. Provisional Application No. 60/173,153 filed Dec. 27, 1999.

BACKGROUND OF THE INVENTION

This invention relates generally to electronically commutated motors, and more particularly, to an input/output circuit for an electronically commutated motor which facilitates speed selection.

Electronically commutated motors (ECMs) are used in a wide variety of applications. In many applications, either discrete speed options or infinitely variable speed operation is desired. Known ECMs which permit the operating speed to be varied include resistor divided networks and a plurality of taps. The resistor divided networks operate in conjunction with the plurality of taps to enable a different operating speed to be selected for the ECM. Different hardware models, or different software limits, are required for each application. As a result, many different motor models typically must be maintained in inventory for multiple applications.

BRIEF SUMMARY OF THE INVENTION

In an exemplary embodiment, an electronically commutated motor includes an input/output (I/O) unit which permits a user to select discrete operating speed options. The I/O unit is electrically connected to a connector terminal board and a microprocessor. The connector terminal board includes an electrically erasable programmable read-only memory (EEPROM), non-isolated low voltage signal connections for programming the EEPROM and speed signal connections for enabling selection of an operating speed for an electronically commutated motor.

In one specific embodiment, preprogrammed speed tables stored within the EEPROM include five different operating speeds and a low voltage variable speed. To select a speed, a voltage is applied to a combination of the speed signal connections. As a result, a cost-effective and reliable electronically commutated motor assembly is provided which increases the flexibility to the user.

DETAILED DESCRIPTION OF THE INVENTION

Figure 1:
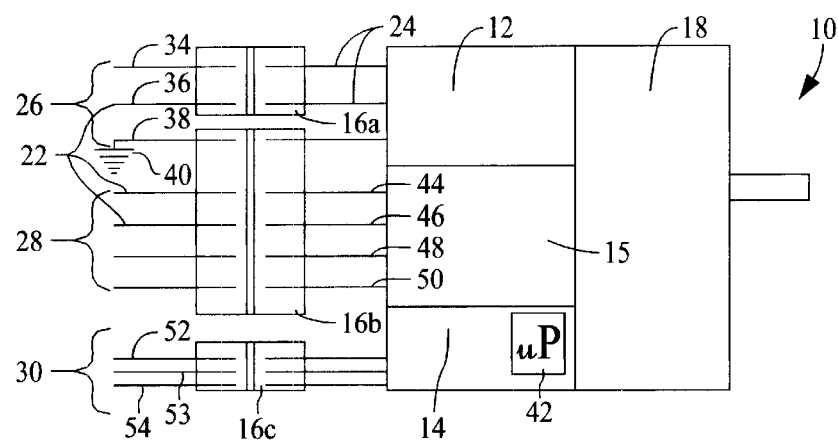
FIG. 1 is a schematic diagram of an electronically commutated motor assembly including a power circuit and an input/output unit.

FIG. 1 is a schematic diagram of an electronically commutated motor assembly 10 including a power circuit 12, an input/output unit 14, an input/output unit 15 and connectors 16a, 16b, and 16c. In one embodiment, input/output unit 15 accepts low voltage power in a range of 15 to 33 VRMS, preferably at 24 VAC. Electronically commutated motor assembly 10 permits a user to select discrete operating speed options for a motor 18 to drive a plurality of components (not shown). In one embodiment, electronically commutated motor assembly 10 controls an operating speed of a fan (not shown) and motor 18 is a GE 39 Frame, 0.5 inch shaft diameter motor commercially available from General Electric Company, Plainville, Conn., and manufactured in Springfield, Mo.

Connectors 16a, 16b, and 16c include a plurality of input terminals 22 electrically connected to a plurality of corresponding electrical lines 24. Specifically, connectors 16a, 16b, and 16c include power supply circuit input terminals 26 and speed signal input terminals 28. Power supply circuit input terminals 26 permit power to be supplied to power circuit 12 and electronically commutated motor assembly 10. Speed signal input terminals 28 permit a user to select discrete operating speed options (described in more detail below) for electronically commutated motor assembly 10. As power is applied to different combinations of speed signal input terminals 28, different discrete operating speeds are selected. Connector terminals 16 also include a plurality of low voltage signal input terminals 30. In one embodiment, input terminals 26 are known as a power connector interface, input terminals 28 are known as a customer connector interface, and input terminals 30 are known as the programming interface.

Connectors 16a, 16b, and 16c are electrically connected to power circuit 12, input/output unit 14, and input/output unit 15. Specifically, connectors 16a, 16b, and 16c are electrically connected to power circuit 12 with lines 34, 36, and 38. Lines 34 and 36 are power supply lines extending from a power supply source (not shown) to supply power to power circuit 12. In one embodiment, lines 34 and 36 are electrically connected to a power supply source capable of supplying between 180 VAC to 264 VAC and 50/60 Hertz. Line 38 electrically connects electronically commutated motor assembly 10 to a ground 40.

Input/output unit 15 is optically isolated and is electrically connected to a microprocessor 42 and to connectors 16a, 16b, and 16c. Input/output unit 14 inputs data to microprocessor 42 which is programmable from an electrically erasable programmable read-only memory, EEPROM, (not shown in FIG. 1) to control the operating speed of electronically commutated motor 18. In one embodiment, microprocessor 42 is a COP884CG available from National Semiconductor, Santa Clara, Calif. Lines 44, 46, 48 and 50 are electrically connected between speed signal input terminals 28 and input/output unit 15. Line 48 supplies data to input/output unit 15 and microprocessor 42 to control electronically commutated motor assembly 10 during high speed operations. Similarly, lines 50 and 46 control electronically commutated motor assembly 10 during medium speed and low speed operations respectively. Line 44 is a return line.

Connectors 16a, 16b, and 16c are also electrically connected to microprocessor 42 with low voltage signal input terminals 30. Specifically, lines 52, 53, and 54 extend between microprocessor 42 and connector 16c. Lines 52, 53, and 54 permit General Electric Company or an original equipment manufacturer, OEM, to input data to program the EEPROM.

Figure 2:
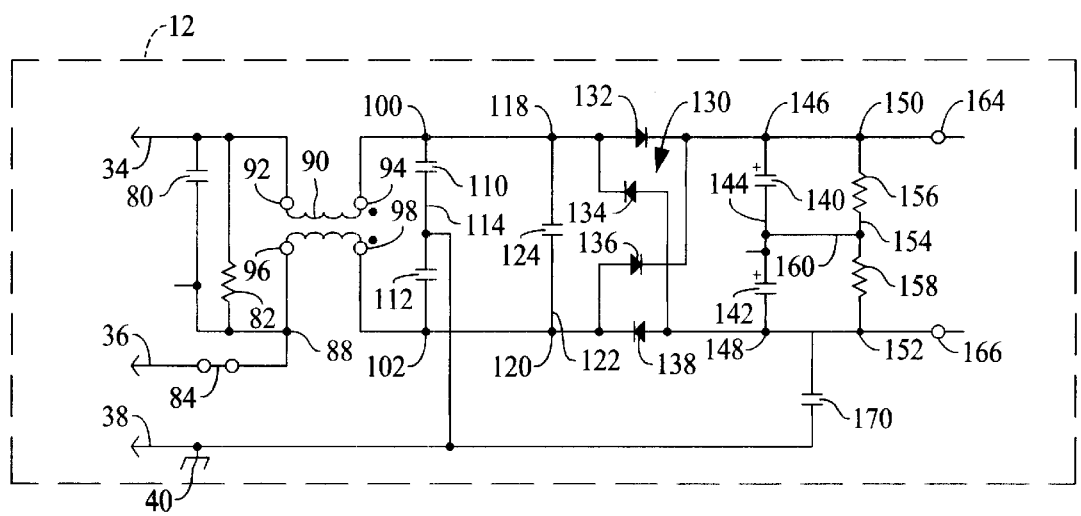
FIG. 2 is a schematic circuit diagram of a portion of the power circuit shown in FIG. 1.

FIG. 2 is a schematic circuit diagram of a portion of power circuit 12. In one embodiment, power circuit 12 is electrically connected to a power supply source (not shown) capable of supplying between 180 VAC to 264 VAC and 50/60 Hertz. Low voltage electronically commutated motor assembly 10 (shown in FIG. 1) has a preferred operating range between 200 VAC to 240 VAC.

Power circuit 12 is electrically connected to connector 16a (shown in FIG. 1) with lines 34, 36, and 38. A capacitor 80 and a resistor 82 are electrically connected in parallel between lines 34 and 36 and a jumper 84 is electrically connected in series to line 36 between connector terminals 16 and a connection node 88. Capacitor 80 and resistor 82 are electrically connected to line 36 at connection node 88. Lines 34 and 36 are each electrically connected to a common mode inductor 90.

Common mode inductor 90 is electrically connected between connection nodes 92 and 94 to line 34 and between connection nodes 96 and 98 to line 36. Lines 34 and 36 extend from connection nodes 94 and 98 respectively to connection nodes 100 and 102. A pair of capacitors 110 and 112 are electrically connected to a line 114. Line 114 is electrically connected to lines 34 and 36 at connection nodes 100 and 102 respectively. In one embodiment, capacitors 110 and 112 are 0.010 μF capacitors.

Lines 34 and 36 extend electrically from connection nodes 100 and 102 to connection nodes 118 and 120. A line 122 is electrically connected between connection nodes 118 and 120 to lines 34 and 36 respectively. Line 122 includes a capacitor 124 electrically connected in series with line 122 and in parallel to capacitors 110 and 112. In one embodiment, capacitor 124 is 0.22 μF capacitor.

A full wave bridge 130 is electrically connected between lines 34 and 36 and includes diodes 132, 134, 136, and 138. Full wave bridge 130 converts AC power from transformer 90 to a DC signal. In one embodiment, diodes 132, 134, 136, and 138 are each 6A/600V diodes.

A pair of capacitors 140 and 142 are electrically connected between lines 34 and 36 and receive the DC signal from full wave bridge 130. In one embodiment, capacitors 140 and 142 are 680 μF capacitors. Capacitors 140 and 142 are electrically connected to a line 144 electrically connected to lines 34 and 36 at connection nodes 146 and 148 respectively. Connection node 146 is located between full wave bridge 130 and a connection node 150, and connection node 148 is located between full wave bridge 130 and a connection node 152. A line 154 is electrically connected at connection nodes 150 and 152 to lines 34 and 36 respectively. A pair of resistors 156 and 158 are electrically connected in series to line 154 between lines 34 and 36. In one embodiment, resistors 156 and 158 are each 220K ohm resistors. A line 160 is electrically connected to line 144 between capacitors 140 and 142 and extends to electrically connect to line 154 between resistors 156 and 158.

Lines 34 and 36 are further electrically connected between connection nodes 150 and 152 to a pair of connection nodes 164 and 166. Connection nodes 164 and 166 provide attachment terminals to supply power to electronically commutated motor assembly 10. Line 38 is electrically connected to line 36 at a connection node 168 which is located between connection nodes 148 and 152. A capacitor 170 is electrically connected in series to line 38 between ground 40 and connection node 168. In one embodiment, capacitor 170 is a 0.0047 μF capacitor.

It should be noted that several nodes, e.g., 100, 102, could be viewed as a common node with other nodes identified, e.g., 118, 120, and that FIG. 2 describes elements separately merely to exemplify connections between elements.

Figure 3:
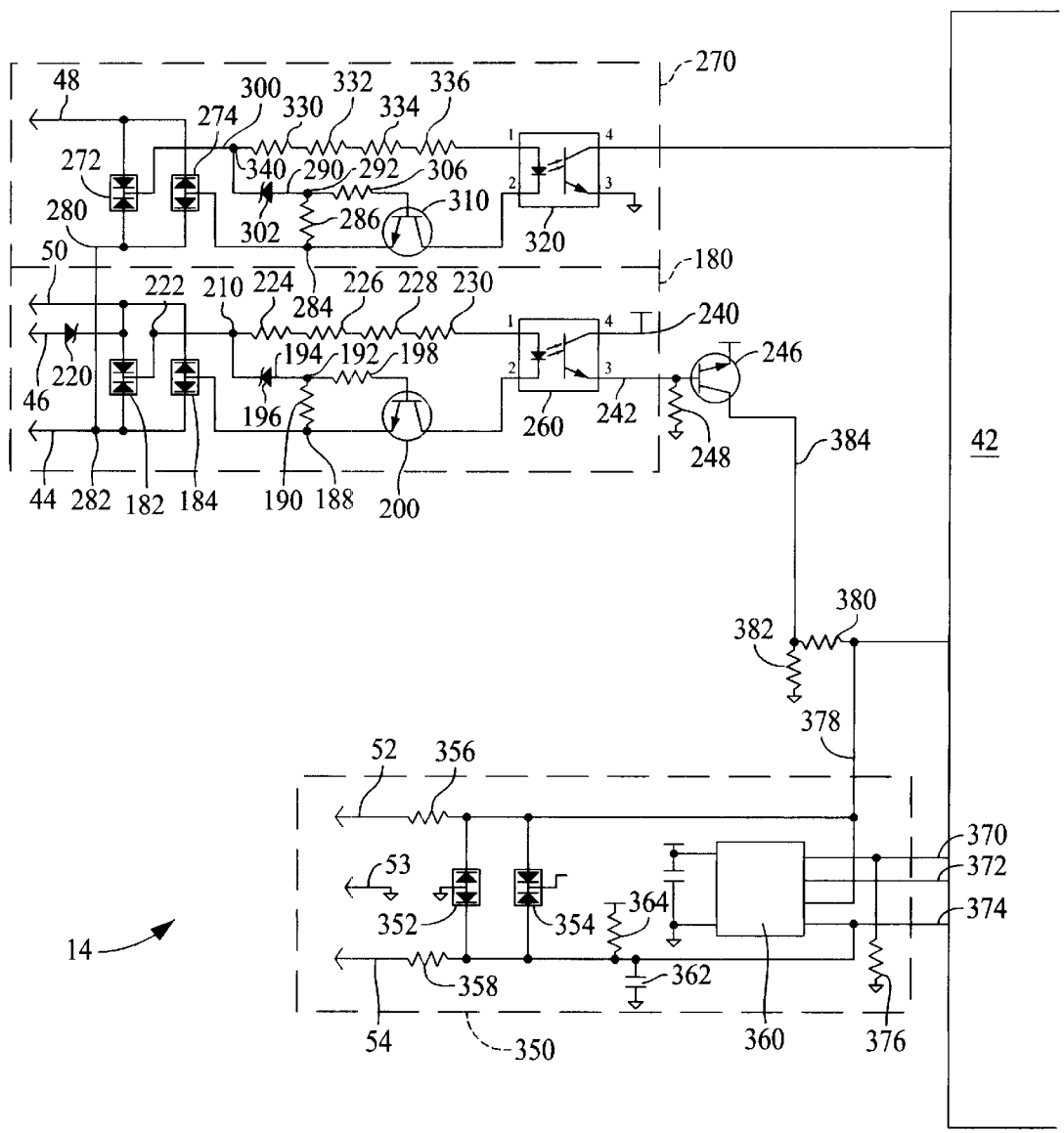
FIG. 3 is a schematic circuit diagram of a portion of the isolated input/output unit shown in FIG. 1 including a non-isolated programming circuit.

FIG. 3 is a schematic circuit diagram of a portion of input/output unit 14 (shown in FIG. 1) and input/output unit 15 (shown in FIG. 1). Input/output 15 is for use with electronically commutated motor assembly 10 and is electrically connected to connector terminal 16b with lines 44, 46, 48, and 50. Lines 44 and 46 are electrically connected to an optically isolated circuit 180. Optically isolated circuit 180 includes a first diode assembly 182 and a second diode assembly 184. Diode assemblies 182 and 184 rectify AC voltages transmitted through connector 16b and are electrically connected in parallel between lines 44 and 50. Line 46 is also connected to diode assemblies 182 and 184 by means of a diode 220.

Line 44 extends from second diode assembly 184 to a connection node 188. A resistor 190 is electrically connected between line 44 at connection node 188 and a connection node 192 located on a line 194. Line 194 is electrically connected between lines 44 and 46 and includes a zener diode 196 electrically connected between connection node 192 and node 210. An additional resistor 198 is electrically connected in series to line 194 between connection node 192 and an NPN transistor 200. In one embodiment, resistors 190 and 198 are 10K ohm resistors.

NPN transistor 200 is electrically connected to lines 44 and 194. Line 44 extends from NPN transistor 200 to electrically connect to an optically coupled isolator 260. Optically coupled isolator 260 is electrically connected to lines 44 and 46. In one embodiment, optically coupled isolator 260 is a PC367 commercially available from NEC, Camas, Wash. Optically coupled isolator 260 receives AC power from connector terminals 16 and produces a pulse wave modulation signal.

Line 46 includes a zener diode 220 electrically connected in series between connector 16b and lines 46 and 50. Four resistors 224, 226, 228, and 230 are each electrically connected in series on line 46 between a connection node 222 and optically coupled isolator 260. Connection node 210 electrically connects line 194 to line 46 through diode 196. In one embodiment, resistors 224, 226, 228, and 230 are each 5.10K ohm resistors.

A line 240 is electrically connected to optically coupled isolator 260 and extends from a power supply (not shown). In one embodiment, line 240 supplies a 5V DC power supply for optical isolation. A line 242 extends from optically coupled isolator 260 to a PNP transistor 246. PNP transistor 246 is electrically connected in series between microprocessor 42 and optically coupled isolator 260. A resistor 248 is electrically connected to line 242 between optically coupled isolator 260 and PNP transistor 246 and extends to microprocessor ground.

Lines 44 and 48 are electrically connected to a second optically isolated circuit 270 which is constructed substantially similar to optically isolated circuit 180. Optically isolated circuit 270 includes a first diode assembly 272 and a second diode assembly 274 to rectify AC voltages transmitted through connector 16b. Diode assemblies 272 and 274 are electrically connected in parallel between lines 48 and a line 280 electrically connected to line 44 at connection node 282. Connection node 282 is located between connector terminals 16 and first diode assembly 182 of optically isolated circuit 180.

Line 280 extends from second diode assembly 274 to a connection node 284. A resistor 286 is electrically connected between line 280 at connection node 284 and a line 290 at connection node 292. Line 290 is electrically connected between line 280 and a line 300 and includes a zener diode 302 electrically connected between resistor 286 and line 300. An additional resistor 306 is electrically connected in series to line 300 between connection node 292 and a NPN transistor 310. In one embodiment, resistors 286 and resistors 306 are 10K ohm resistors.

NPN transistor 310 is electrically connected in series to lines 280 and 290. Line 280 extends from NPN transistor 310 to electrically connect to an optically coupled isolator 320. Optically coupled isolator 320 is electrically connected to lines 280 and 300. Line 300 is electrically connected to first diode assembly 272 and includes four resistors 330, 332, 334, and 336. Each resistor 330, 332, 334, and 336 is connected in series on line 300 between a connection node 340 and optically coupled isolator 320. Connection node 340 electrically connects line 290 and line 300. In one embodiment, resistors 330, 332, 334, and 336 are each 5.10K ohm resistors.

A programming circuit 350 is electrically connected to microprocessor 42 and to optically coupled isolator circuit 180. Programming circuit 350 includes data input line 52 and data return line 54. A pair of diode assemblies 352 and 354 are electrically connected in parallel between lines 52 and 54. Each line 52 and 54 includes a resistor 356 and 358 respectively, electrically connected in series. Lines 52 and 54 are also electrically connected to an electrically erasable programmable read-only memory (EEPROM) 360. A capacitor 362 and a resistor 364 are each electrically connected to line 54 between second diode assembly 354 and EEPROM 360. In one embodiment, EEPROM 360 is a NM93C46EMB available from Samsung, South Korea. Three lines 370, 372, and 374 are electrically connected between EEPROM 360 and microprocessor 42. Line 370 is electrically connected to a resistor 376 which goes to ground. An additional line 378 is electrically connected to a pair of resistors 380 and 382 electrically connected in series to a line 384 electrically connected between microprocessor 42 and PNP transistor 246. Programming circuit 350 permits EEPROM 360 to be programmed with the user's requirements including speed table schedules which permit the user to select discrete speeds. In one embodiment, resistors 376 and 380 are 27K ohm resistors and resistor 382 is a 10K ohm resistor.

In operation, external speed control is provided for the user for low voltage electronically commutated motor assembly 10 with input/output unit 15 or a high voltage input/output unit (not shown in FIG. 2). When using low voltage input/output unit 15, five different speeds are available for discrete selection from preprogrammed speed tables stored within EEPROM 360. Additionally input/output unit 14 permits the user to operate electronically commutated motor 18 with variable speeds. In alternative embodiments, instead of speed, the tables could contain torque values or constant airflow number values.

Initially the user must select either low voltage electronically commutated motor assembly 10 or a high voltage electronically commutated motor assembly (not shown in FIG. 3). After selecting low voltage electronically commutated motor assembly 10, EEPROM 360 is programmed to include speed table schedules. To select an operating speed, the user applies low voltage to a combination of lines 46, 48, and 50 while voltage is simultaneously applied to power supply circuit 12. A desired speed table is selected by applying voltage to the appropriate lines 46, 48, and 50 in combination with a connection to line 44. After voltage is applied to the appropriate lines 46, 48, and 50, microprocessor 42 determines which speed table schedule is being utilized and which discrete operating speed is selected. For example, electronically commutated motor assembly 10 remains off if all lines 46, 48, and 50 are open, but operates at a first speed if voltage is applied across lines 46 and 44.

Lines 46, 48, and 50 are opto-isolated to allow the 24 VAC signal to be safety ground referenced. Three speed tables are available for operating electronically commutated motor 18 with low voltage electronically commutated motor assembly 10. Each speed table to be selected is dependent upon the number of inputs 22 and electrical lines 24 available to the user. The three speed tables listed below indicate the appropriate input connections to obtain each desired speed or desired pre-programmed speed schedule.

Additionally, variable speed operation is available when using low voltage electronically commutated motor assembly 10. Variable speed operation is regulated with pulse width modulation input. For example, operating with a duty cycle of less than 15%, turns the control off, while operating with a duty cycle that is greater than or equal to 20%, turns the control on. A motor speed varies proportionally to the percent of duty cycle (%dc) input as follows:

RPM=MIN RPM+% dc(MAX RPM−MIN RPM)

wherein the minimum and maximum speeds are scaled requirements. The lowest speed is 300 rpm and the maximum speed is 1200 rpm.

Five Line Option: Low Voltage ECM; this option uses lines 50 and 44 for selecting an operating speed, and lines 34, 36, and 38 for power supply circuit 12.

| MOTOR ACTION | Line 44 | Line 50 |
| --- | --- | --- |
| OFF | Return Line | No Connection |
| SPEED 1 | Return Line | ½ Wave Voltage Applied (line frequency signal) |
| SPEED 2 | Return Line | Full Wave Voltage Applied (2x line frequency signal) |
| VARIABLE SPEED | Return Line | 10 to 30 Vpk PWM (Duty Cycle) Applied |

As can be seen from the Five Line Low Voltage Option Speed Table shown above, low voltage electronically commutated motor assembly 10 permits electronically commutated motor 18 to operate with only two inputs 22 in addition to power circuit 12. The Five Line Option Speed Table provides two speeds options, in addition to the variable speed option. Other speed tables provide additional speed options to the user and additional flexibility while using low voltage electronically commutated motor assembly 10. One such speed table is the Six Line Option Speed Table shown below.

Six Line Option: Low Voltage ECM; this option uses lines 50, 48, and 44 for selecting, and lines 34, 36, and 38 for power supply circuit 12.

| MOTOR ACTION | Line 50 | Line 48 | Line 44 |
| --- | --- | --- | --- |
| OFF | No Connection | No Connection | Return Line |
| SPEED 2 | Voltage Applied | No Connection | Return Line |
| SPEED 3 | No Connection | Voltage Applied | Return Line |
| SPEED 5 | Voltage Applied | Voltage Applied | Return Line |

-continued

| MOTOR ACTION | Line 50 | Line 48 | Line 44 |
|---|---|---|---|
| PROGRAM SCHEDULE 1 | No Connection | Half wave Voltage Applied | Return Line |
| PROGRAM SCHEDULE 3 | Voltage Applied | Half wave Voltage Applied | Return Line |
| VARIABLE SPEED | 10 to 30 Vpk PWM (duty cycle) Applied | No Connection | Return Line |

As can be seen from the Six Line Option Speed Table shown above, low voltage electronically commutated motor assembly 10 permits electronically commutated motor 18 to operate using only three inputs 22 in addition to power circuit 12. The Six Line Option Speed Table provides three speed options in addition to the variable speed option, and two program schedules. Other speed tables provide additional speed options to the user and additional flexibility while using low voltage electronically commutated motor assembly 10. One such speed table is the Seven Line Option Speed Table shown below.

Seven Line Option: Low Voltage Input Model; this option uses lines 10 48, 50, 46, and 44 for selecting, and lines 34, 36, and 38 for power circuit 12.

| MOTOR ACTION | Line 46 | Line 50 | Line 48 | Line 44 |
|---|---|---|---|---|
| OFF | No Connection | No Connection | No Connection | Return Line |
| SPEED 1 | Voltage Applied | No Connection | No Connection | Return Line |
| SPEED 2 | Connected or unconnected | Voltage Applied | No Connection | Return Line |
| SPEED 3 | No Connection | No Connection | Voltage Applied | Return Line |
| SPEED 4 | Voltage Applied | No Connection | Voltage Applied | Return Line |
| SPEED 5 | Connected or unconnected | Voltage Applied | Voltage Applied | Return Line |
| PROGRAM SCHEDULE 1 | No Connection | No Connection | Half wave Voltage Applied | Return Line |
| PROGRAM SCHEDULE 2 | Voltage Applied | No Connection | Half wave Voltage Applied | Return Line |
| PROGRAM SCHEDULE 3 | No Connection | Voltage Applied | Half wave Voltage Applied | Return Line |
| VARIABLE SPEED | No Connection | 10 to 30 Vpk PWM (Duty Cycle)Applied | No Connection | Return Line |

As can be seen from the Seven Line Option Speed Table shown above, low voltage electronically commutated motor assembly 10 permits electronically commutated motor 18 to operate using with four inputs 22 in addition to power circuit 12. The Seven Line Option Speed Table increases the flexibility to the user and provides five speed options in addition to the variable speed option, and three program schedules.

Figure 4:
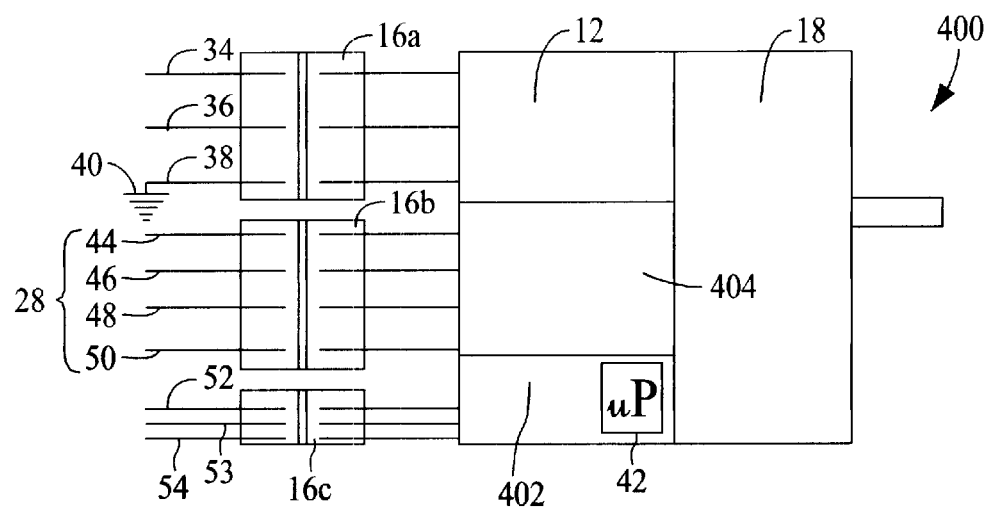
FIG. 4 is a schematic diagram of an alternative embodiment of an electronically commutated motor assembly including an input/output unit.

FIG. 4 is a schematic diagram of a high voltage electronically commutated motor assembly 400 including power circuit 12, an input/output unit 402, connectors 16a, 16b, and 16c, and a high voltage input/output unit 404. Electronically commutated motor assembly 400 permits a user to select discrete operating speed options for motor 18 to drive a plurality of components (not shown). In one embodiment, high voltage electronically commutated motor assembly 400 accepts high voltage power in a range of 180 VAC to 264 VAC and 50/60 Hertz with a preferred operating range between 200 VAC to 240 VAC.

Connectors 16a, 16b, and 16c are electrically connected to input/output unit 402, power circuit 12, and high voltage input/output unit 404. Input/output unit 402 inputs data to microprocessor 42 which is programmable from EEPROM 360 (shown in FIG. 3) to control the operating speed of electronically commutated motor 18. Lines 44, 46, 48 and 50 are electrically connected between speed signal input terminals 28 and input/output unit 404. Line 48 supplies data to input/output unit 404 and microprocessor 42 to control electronically commutated motor assembly 10 during high speed operations. Similarly, lines 50 and 46 control electronically commutated motor assembly 10 during medium speed and low speed operations respectively.

Connector terminals 16 are also electrically connected to microprocessor 42 with low voltage signal input connections 30 (shown in FIG. 1). Specifically, lines 52 and 54 extend between microprocessor 42 and connector 16c. Lines 52 and 54 permit General Electric or an original equipment manufacturer, OEM, to input data to program electrically erasable programmable read-only memory 360.

Figure 5:
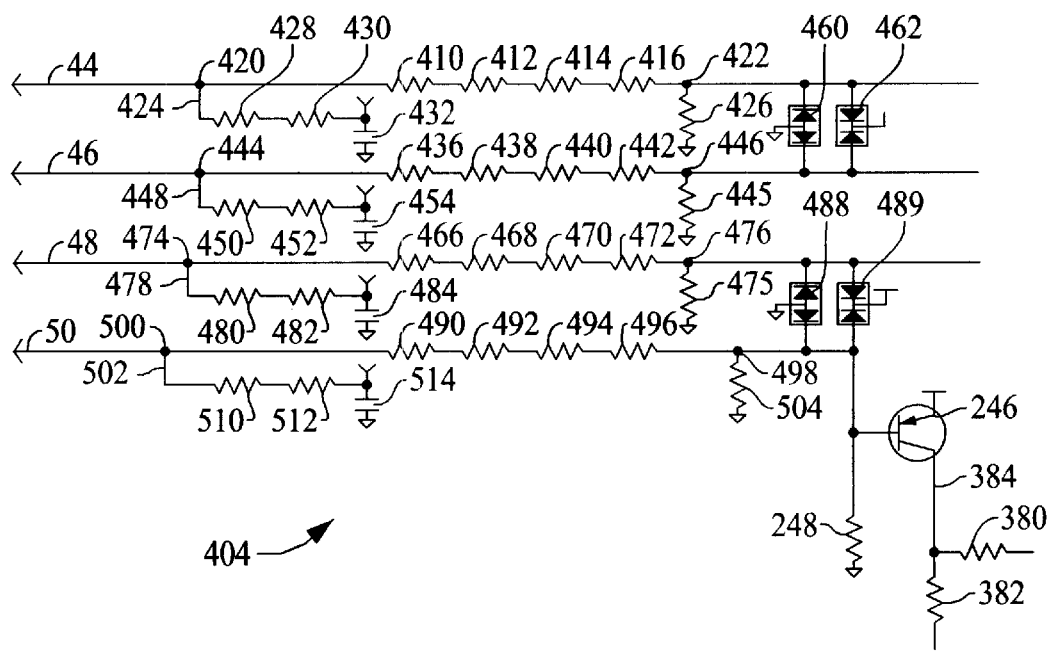
FIG. 5 is a schematic circuit diagram of a portion of the high voltage input/output unit shown in FIG. 4.

FIG. 5 is a schematic circuit diagram of a portion of input/output unit 404 (shown in FIG. 4). Input/output 404 is a high voltage interface is for use with high voltage electronically commutated motor assembly 400 and is electrically connected to connector 16b with lines 44, 46, 48, and 50.

Line 44 is electrically connected to connector terminals 16 and extending to microprocessor 42. Line 44 includes four resistors 410, 412, 414, and 416 electrically connected in series between a connection node 420 and a connection node 422. In one embodiment, resistors 410, 412, 414, and 416 are each 110K ohm resistors. Line 44 is electrically connected to a line 424 at connector node 420 and a resistor 426 at connection node 422. Line 424 insures that line 44 will not be a "dry" circuit. A "dry" circuit has low current and oxide can form on relay contacts causing high resistance. Line 424 includes a pair of resistors 428 and 430 electrically connected in series between connection node 420 and a capacitor 432. Capacitor 432 is electrically connected between resistor 430 and circuit ground. In one embodiment, resistors 428 and 430 are each 13K ohm resistors and resistor 426 is a 10K ohm resistor.

Line 46 is electrically connected between connector 16b and microprocessor 42. Line 46 includes four resistors 436, 438, 440, and 442 electrically connected in series between a connection node 444 and a connection node 446. In one embodiment, resistors 436, 438, 440, and 442 are each 110K ohm resistors. Line 46 is connected to a line 448 at connection node 444 and a resistor 445 at connection node 446. Line 448 is constructed identically to line 424 and includes a pair of resistors 450 and 452 and a capacitor 454. In one embodiment, resistors 450 and 452 are each 13K ohm resistors and resistor 445 is a 10K ohm resistor. A pair of diode assemblies 460 and 462 are connected in parallel between lines 44 and 46.

Line 48 is electrically connected between connector 16b and microprocessor 42. Line 48 includes four resistors 466, 468, 470, and 472 electrically connected in series between a connection node 474 and a connection node 476. In one embodiment, resistors 466, 468, 470, and 472 are each 110K ohm resistors. Line 48 is connected to a line 478 at connection node 474 and a resistor 475 at connection node 476.

Line 478 is constructed identically to line 424 and includes a pair of resistors 480 and 482 and a capacitor 484. In one embodiment, resistors 480 and 482 are each 13K ohm resistors and resistor 475 is a 10K ohm resistor. A pair of diode assemblies 488 and 489 are connected in parallel between lines 48 and 50.

Line 50 is electrically connected to connector terminals 16 and includes four resistors 490, 492, 494, and 496 electrically connected between a connection node 498 and a connection node 500. In one embodiment, resistors 490, 492, 494, and 496 are each 110K ohm resistors. Line 50 is connected to a line 502 at connection node 500 and a resistor 504 at connection node 498. Line 502 is constructed identically to line 424 and includes a pair of resistors 510 and 512 and a capacitor 514. In one embodiment, resistors 510 and 512 are each 13K ohm resistors and resistor 504 is a 10K ohm resistor. Line 50 is electrically connected between connection node 500 and PNP transistor 246. PNP transistor 246 is electrically connected in series between line 50 and programming circuit 350.

In operation, external speed control is provided for the user with high voltage electronically commutated motor assembly 400 and five different speeds are available for discrete selection from preprogrammed speed tables stored within EEPROM 360. Additionally high voltage electronically commutated motor assembly 400 permits the user to select three different program speed schedules shown below.

Initially the user must select high voltage electronically commutated motor assembly 400 for use with electronically commutated motor 16 and EEPROM 360 is preprogrammed by the OEM to include speed table schedules. Alternatively, the tables may be pre-programmed to include torque values or constant airflow numbers. To select a speed, the user applies voltage to a combination of lines 50, 48, and 46 while voltage is simultaneously applied to power circuit 12. A desired speed table is selected by applying voltage to the appropriate lines 50, 48, and 46 in combination with a connection to line 44. After voltage is applied to the appropriate lines 50, 48, and 46, EEPROM 360 signals microprocessor 42 regarding which discrete operating speed is selected. For example, electronically commutated motor assembly 400 remains off if all lines 50, 48, 44, and 46 are open, but operates at a first speed if voltage is applied to line 46. Other operating speeds are shown below.

Seven Line Option: High Voltage ECM; this option uses lines 48, 50, 46, and 44 for selecting an operating speed, and lines 34, 36, and 38 for power circuit 12.

| ACTION | Line 46 | Line 50 | Line 48 | Line 44 (program pin if ½ wave voltage applied) |
|---|---|---|---|---|
| OFF | No Connection | No Connection | No Connection | No Connection |
| SPEED 1 | Voltage Applied | No Connection | No Connection | No Connection |
| SPEED 2 | Connected or unconnected | Voltage Applied | No Connection | No Connection |
| SPEED 3 | No Connection | No Connection | Voltage Applied | Connected or unconnected |
| SPEED 4 | Voltage Applied | No Connection | Voltage Applied | Connected or unconnected |
| SPEED 5 | Connected or unconnected | Voltage Applied | Voltage Applied | Connected or unconnected |

-continued

| ACTION | Line 46 | Line 50 | Line 48 | Line 44 (program pin if ½ wave voltage applied) |
|---|---|---|---|---|
| PROGRAM SCHEDULE 1 | No Connection | No Connection | No Connection | Voltage Applied |
| PROGRAM SCHEDULE 2 | Voltage Applied | No Connection | No Connection | Voltage Applied |
| PROGRAM SCHEDULE 3 | No Connection | Voltage Applied | No Connection | Voltage Applied |

Figure 6:
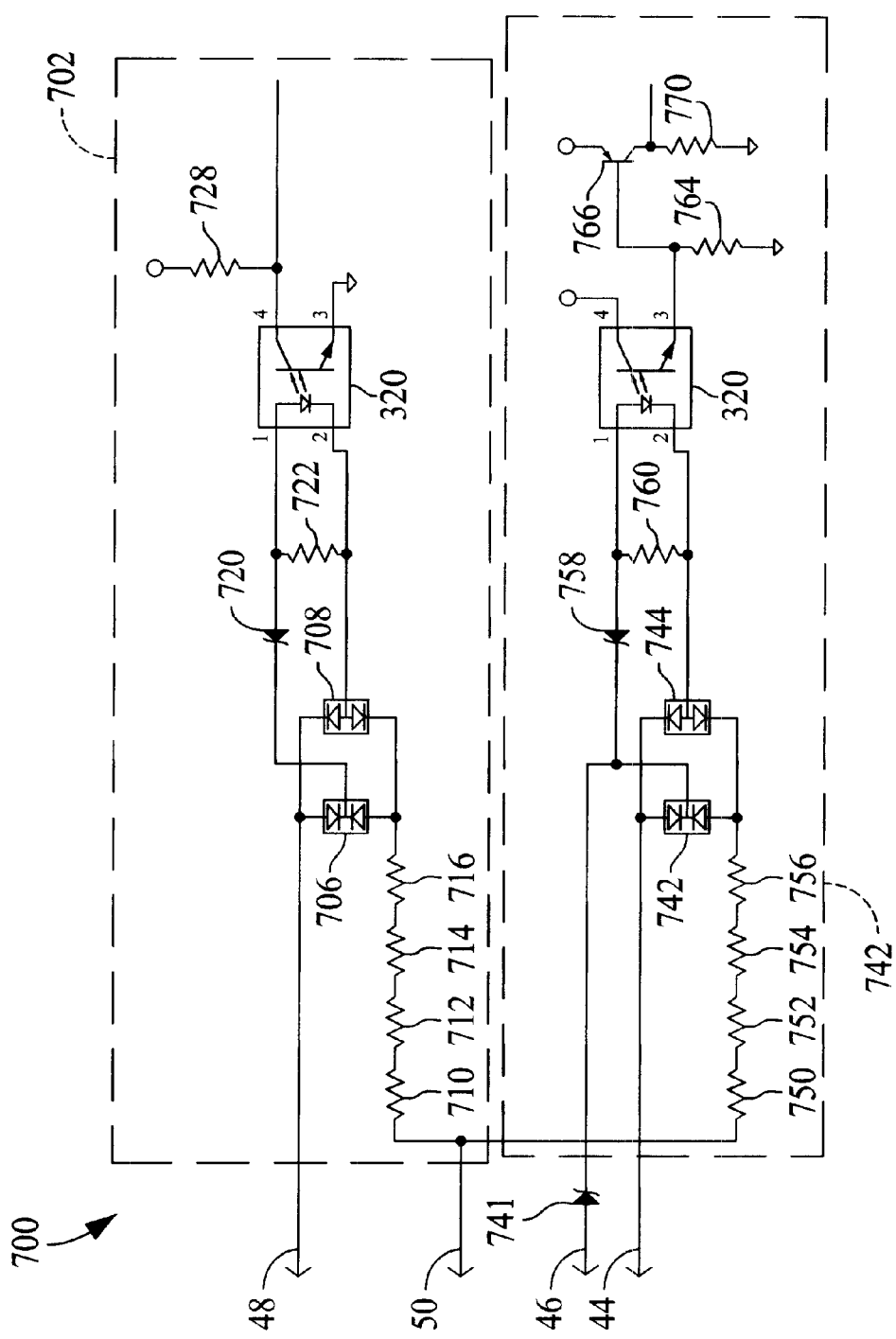
FIG. 6 is a schematic circuit diagram of an alternative embodiment of an isolated input/out put unit used for low voltage interface.

FIG. 6 is a schematic circuit diagram of a portion of an alternative embodiment of an isolated input/output unit 700. Input/output unit 700 is substantially similar to input/output unit 15 (shown in FIGS. 1 and 3) and components in input/output unit 700 that are identical to components of input/output unit 15 are identified in FIG. 6 using the same reference numerals used in FIGS. 1 and 3. Input/output 700 is a low voltage interface for use with electronically commutated motor assembly 10 (shown in FIG. 1) and is electrically connected to connector terminal 16b (shown in FIG. 1) with lines 44, 46, 48, and 50. Lines 48 and 50 are electrically connected to an optically isolated circuit 702. Optically isolated circuit 702 includes a first diode assembly 706 and a second diode assembly 708. Diode assemblies 706 and 708 rectify AC voltages transmitted through connector 16b and are electrically connected in parallel between lines 48 and 50. Line 50 is known as a return line and is coupled to diode assemblies 706 and 708 through four resistors 710, 712, 714, and 716 electrically connected in series. In one embodiment, resistors 710, 712, 714, and 716 are each 5.10K ohm resistors.

A zener diode 720 is coupled to first diode assembly 706, and a resistor 722 is electrically connected between zener diode 720 and second diode assembly 708. In one embodiment, resistor 722 is a 10K ohm resistor. Resistor 722 is also electrically coupled to optically coupled isolator 320. Optically coupled isolator 320 receives AC power from connector terminals 16 (shown in FIG. 1) and produces a pulse wave modulation signal. A resistor 728 is electrically coupled between optically coupled isolator 320 and a power source. In one embodiment, resistor 728 is a 25K ohm resistor.

Lines 46 and 44 are electrically connected to an optically isolated circuit 740. More specifically, line 46 is electrically connected to optically isolated circuit 740 through a zener diode 741. Optically isolated circuit 740 includes a first diode assembly 742 and a second diode assembly 744. Diode assemblies 742 and 744 rectify AC voltages transmitted through connector 16b and are electrically connected in parallel between lines 44 and 46. Line 50 is known as a return line and is coupled to diode assemblies 742 and 744 through four resistors 750, 752, 754, and 756 electrically connected in series. In one embodiment, resistors 750, 752, 754, and 756 are each 5.10K ohm resistors.

A zener diode 758 is coupled to first diode assembly 742, and a resistor 760 is electrically connected between zener diode 758 and second diode assembly 744. In one embodiment, resistor 760 is a 10K ohm resistor. Resistor 760 is also electrically coupled to optically coupled isolator 320. Optically coupled isolator 320 receives AC power from connector terminals 16 and produces a pulse wave modulation signal.

A resistor 764 is electrically coupled between optically coupled isolator 320 and ground. In one embodiment, resistor 728 is a 27K ohm resistor. A PNP transistor 766 is coupled to resistor 764 and is electrically connected in series between microprocessor 42 (shown in FIG. 1) and optically coupled isolator 320. More specifically, a first resistor 768 is electrically connected between microprocessor 42 and PNP transistor 766, and a second resistor 770 is electrically connected between PNP transistor 766 and ground. In one embodiment, resistor 770 is a 10K ohm resistor, and resistor 768 is a 27K ohm resistor.

It should be noted that elements 706, 708, 710, 712,714, 716, 720, 741, 742, 744, 750, 752, 754, 756, 764, 766, 768, 770, could be interchanged with elements 272, 274, 330, 332, 334, 336, 302, 220, 182, 184, 224, 226, 228, 230, 246, 246, 380, and 382, respectively.

Figure 7:
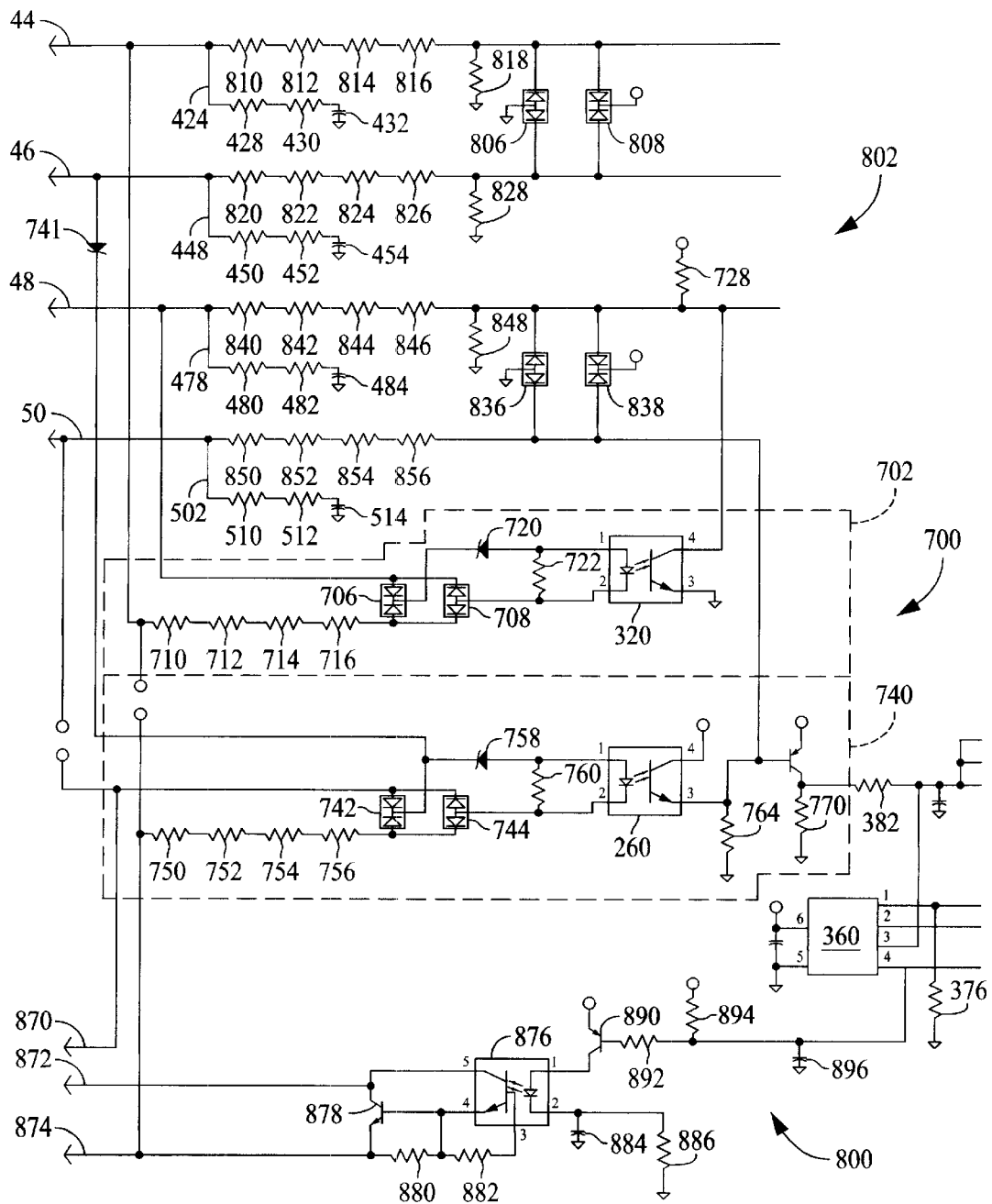
FIG. 7 is a schematic circuit diagram of an alternative embodiment of an isolated programming circuit and a low and high voltage interface.

FIG. 7 is a schematic circuit diagram of an alternative embodiment of an isolated programming circuit 800 coupled to low voltage interface input/output unit 700 and to a high voltage interface input/output unit 802. High voltage interface input/output unit 802 is substantially similar to input/output unit 404 (shown in FIGS. 4 and 5) and components in input/output unit 802 that are identical to components of input/output unit 404 are identified in FIG. 7 using the same reference numerals used in FIG. 4. Additionally, isolated programming circuit 800 is substantially similar to programming circuit 350 (shown in FIG. 3) and components in programming circuit 800 that are identical to components of programming circuit 350 are identified in FIG. 7 using the same reference numerals used in FIG. 3.

Input/output 802 is a high voltage interface for use with a high voltage electronically commutated motor assembly, such as motor assembly 400, shown in FIG. 4, and is electrically connected to connector 16b (shown in FIG. 1) with lines 44, 46, 48, and 50. Lines 46 and 44 are electrically coupled to a first diode assembly 806 and a second diode assembly 808. Diode assemblies 806 and 808 rectify AC voltages transmitted through connector 16b and are electrically connected in parallel between lines 46 and 44. Line 44 is coupled to diode assemblies 806 and 808 through four resistors 810, 812, 814, and 816 electrically connected in series. In one embodiment, resistors 810, 812, 814, and 816 are each 110K ohm resistors. Line 44 is connected to ground between resistor 816 and first diode assembly 806 through a resistor 818 .

Line 44 is also connected to ground with line 502. Line 502 insures that line 44 will not be a "dry" circuit. Line 502 includes resistors 510 and 512 electrically connected in series and a capacitor 514. Capacitor 514 is electrically connected between resistor 512 and circuit ground. In one embodiment, resistors 510 and 512 are each 13K ohm resistors.

Line 46 is electrically coupled to diode assemblies 806 and 808 through four resistors 820, 822, 824, and 826 electrically connected in series. In one embodiment, resistors 820, 822, 824, and 826 are each 110K ohm resistors. Line 46 is connected to ground between resistor 826 and first diode assembly 806 through a resistor 828. Line 46 is connected to ground through line 448. Line 448 is constructed identically with line 424 and includes resistors 450 and 452 and capacitor 454. In one embodiment, resistors 450 and 452 are each 13K ohm resistors.

Lines 48 and 50 are electrically coupled to a first diode assembly 836 and a second diode assembly 838. Diode assemblies 836 and 838 rectify AC voltages transmitted through connector 16b and are electrically connected in parallel between lines 48 and 50. More specifically, line 48 is coupled to diode assemblies 836 and 838 through four resistors 840, 842, 844, and 846 electrically connected in series. In one embodiment, resistors 840, 842, 844, and 846 are each 110K ohm resistors. Line 48 is connected to ground between resistor 846 and first diode assembly 836 through a resistor 848.

Line 48 is also connected to ground with line 478. Line 478 insures that line 48 will not be a "dry" circuit. Line 478 includes resistors 480 and 482 electrically connected in series and a capacitor 484. Capacitor 484 is electrically connected between resistor 482 and circuit ground. In one embodiment, resistors 480 and 482 are each 13K ohm resistors.

Line 50 is electrically coupled to diode assemblies 836 and 838 through four resistors 850, 852, 854, and 856 electrically connected in series. In one embodiment, resistors 850, 852, 854, and 856 are each 110K ohm resistors. Line 50 is connected to ground through a resistor 764. Line 50 is also connected to ground with line 424. Line 424 insures that line 50 will not be a "dry" circuit. Line 424 includes resistors 428 and 430 electrically connected in series and a capacitor 432. Capacitor 432 is electrically connected between resistor 430 and circuit ground. In one embodiment, resistors 428 and 430 are each 13K ohm resistors.

Input/output unit 802 is coupled to low voltage interface input/output unit 700 and to isolated programming circuit 800. Programming circuit 800 is electrically connected to microprocessor 42 and to optically coupled isolator circuit 700. Programming circuit 800 includes a data input line 870, a com line 872, and a data out line 874. Lines 872 and 874 are coupled to an optically coupled isolator 876 through a transistor 878 coupled to lines 872 and 874. More specifically, transistor 878 is coupled to optically coupled isolator 876 through a pair of resistors 880 and 882.

Optically coupled isolator 876 is coupled to ground through a capacitor 884 and through a resistor 886. Optically coupled isolator 876 is also electrically coupled to electrically erasable programmable read-only memory (EEPROM) 360. More specifically, optically coupled isolator 876 is coupled to a transistor 890 which is coupled to EEPROM 360 through a resistor 892. Optically coupled isolator 876 is also coupled to a power source through resistor 892 and a second resistor 894, and connected to ground through resistor 892 and a capacitor 896.

It should be noted that elements 810, 812, 814, 816, 818, 806, 808, 820, 822, 824, 826, 828, 846, 840, 842, 844, 836, 838, 850, 852, 854, 856, 720, 710, 712, 714, 716, 706, 708, 750, 752, 754, 756, 742, and 744, could be interchanged with elements 410, 412, 414, 416, 426, 432, 460, 462, 436, 438, 440, 442, 445, 472, 466, 468, 470, 475, 488, 489, 490, 492, 494, 496, 302, 330, 332, 334, 336, 272, 274, 224, 226, 228, 230, 182, and 184, respectively.

The above-described electronically commutated motor assembly is cost-effective and highly reliable. The assembly includes an input/output unit which in combination with a microprocessor and connector terminals permit a user to select discrete operating speed options to operate an electronically commutated motor. The input/output unit includes an electrically erasable programmable read-only memory (EEPROM). The EEPROM is programmed with numerous speed tables which include speed schedules to operate the electronically commutated motor. As a result, an electronically commutated motor assembly is provided which increases the options available to a user.

While the invention has been described in terms of various specific embodiments, those skilled in the art will recognize that the invention can be practiced with modification within the spirit and scope of the claims.

What is claimed is:

1. A method for programming an operating speed for an electronically commutated motor using an input/output unit electrically connected to a microprocessor, the input/output unit including a connector and a board including an EEPROM, and a plurality of low voltage signal connections, the plurality of low voltage signal connections for programming the microprocessor, the electrically erasable programmable read-only memory connected to the microprocessor and including a speed table configured to control an operating speed of the electronically commutated motor, said method comprising the steps of:

selecting an operating speed for the electronically commutated motor; and supplying a power supply to the board including the EEPROM to select one of the speed table entries corresponding to the desired operating speed for the electronically commutated motor.

2. A method in accordance with claim 1 wherein the connector and the board includes at least three speed signal connections to control the speed of the electronically commutated motor, said step of supplying a power supply further comprising the step of applying supply power to at least one of the at least three speed signal connections.

3. A method in accordance with claim 2 wherein one of the plurality of low voltage connections enables a program/pulse width modulation, said step of supplying a power supply further comprising the step of enabling the program/pulse width modulation connection.

4. A method in accordance with claim 3 wherein the connector terminal board accepts at least one of a low voltage power supply and a high voltage power supply, said step of supplying a power supply further comprising the step of supplying a low voltage to the connector and the board.

5. A method in accordance with claim 2 wherein the connector and the board accepts at least one of a low voltage power supply and a high voltage power supply, said step of supplying a power supply further comprising the step of supplying a high voltage to the connector and the board.

6. An input/output unit electrically connected to a microprocessor controlling an electronically commutated motor, said input/output unit comprising a connector and a board comprising an EEPROM, at least three power connections, and a plurality of low voltage signal connections, said at least three power connections control supply power to said connector and said board, said microprocessor, and the motor, said plurality of low voltage signal connections receive input for programming said microprocessor, said EEPROM connected to said microprocessor.

7. An input/output unit in accordance with claim 6 wherein one of said plurality of low voltage connections comprises a program/pulse width modulation connection, said EEPROM comprises a speed table configured to control an operating speed of the electronically commutated motor.

8. An input/output unit in accordance with claim 7 wherein said speed table comprises a schedule of speeds selectively imputable to said microprocessor.

9. An input/output unit in accordance with claim 8 wherein one of said plurality of low voltage connections comprises a data out line.

10. An input/output in accordance with claim 9 further comprising a plurality of speed signal connections configured to control the speed of the electronically commutated motor.

11. An input/output in accordance with claim 10 wherein said plurality of speed signal connections accept at least one of a low voltage power supply and a high voltage power supply.

12. An input/output in accordance with claim 11 further comprising at least two optically coupled isolators, one of said optically coupled isolators connected to at least one of said low voltage signal connections.

13. An input/output in accordance with claim 12 wherein one of said at least two optically coupled isolators connects to said program/pulse width modulation connection.

14. An electronically commutated motor assembly comprising:

an electronically commutated motor;

an input/output unit electrically connected to said electronically commutated motor for controlling an operating speed of said electronically commutated motor, said input/output unit electrically connected to a microprocessor; and a connector and board comprising an EEPROM, at least three power connections, and a plurality of low voltage signal connections, said power connections control supply power to said connector and board, said input/output unit, and said electronically commutated motor, said low voltage signal connections receive input for programming said microprocessor, said EEPROM comprises a speed table comprising a schedule of speeds which can be selectively input to control an operating speed of said electronically commutated motor.

15. An electronically commutated motor assembly in accordance with claim 14 wherein said connector and board further comprises a plurality of speed connections electrically connected to said input/output unit and configured to selectively control the operational speed of the electronically commutated motor.

16. An electronically commutated motor assembly in accordance with claim 15 wherein one of said plurality of low voltage connections comprises a program/pulse width modulation connection.

17. An electronically commutated motor assembly in accordance with claim 16 wherein said connector terminal board accepts at least one of a low voltage supply power and a high voltage supply power.

18. An electronically commutated motor assembly in accordance with claim 17 wherein one of said plurality of low voltage connections comprises a data out line.

19. An electronically commutated motor assembly in accordance with claim 18 wherein said input/output unit further comprises at least two optically coupled isolators, one of said optically coupled isolators connected to at least one of said low voltage signal connections.

20. A method for selecting an operating speed for an electronically commutated motor assembly using an EEPROM connected to a microprocessor, the motor assembly including an electronically commutated motor, an input/output unit electrically connected to the electronically commutated motor for selecting an operating speed of the electronically commutated motor, a connector and a board electrically connected to the input/output unit and including a plurality of low voltage signal connections and a plurality of speed signal input connections, the plurality of low voltage signal connections for programming the EEPROM, the plurality of speed signal input connections to control the speed of the electronically commutated motor, said method comprising the steps of:

programming the EEPROM;

supplying a power supply to the connector and the board to access the EEPROM; and selecting an operating speed for the electronically commutated motor from the EEPROM.

21. A method in accordance with claim 20 wherein one of the plurality of low voltage connections enables a program/pulse width modulation, said step of supplying a power supply further comprising the step of enabling the program/pulse width modulation connection.

22. A method in accordance with claim 21 wherein the EEPROM is configured to be programmed by an original equipment manufacturer and includes a speed table, said step of programming the EEPROM further comprising the step of programming the EEPROM to include a speed table.

23. A method in accordance with claim 22 wherein the plurality of speed signal input connections are configured to be selected by a user, the speed table including a schedule of speeds selectively imputable to the microprocessor, said step of selecting an operating speed further comprising the step of selecting an operating speed for the electronically commutated motor from the schedule of speeds.

24. A method in accordance with claim 23 wherein the connector and board accepts at least one of a low voltage power supply and a high voltage power supply, said step of supplying a power supply further comprising the step of supplying a low voltage power supply to the connector terminal board.

25. A method in accordance with claim 24 wherein the connector and board accepts at least one of a low voltage power supply and a high voltage power supply, said step of supplying a power supply further comprising the step of supplying a high voltage power supply to the connector and board.

* * * * *